(12) United States Patent
Furui

(10) Patent No.: US 8,711,213 B2
(45) Date of Patent: Apr. 29, 2014

(54) CORRECTION INFORMATION CALCULATING DEVICE, IMAGE PROCESSING APPARATUS, IMAGE DISPLAY SYSTEM, AND IMAGE CORRECTING METHOD

(75) Inventor: Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 404 days.

(21) Appl. No.: 13/021,848

(22) Filed: Feb. 7, 2011

(65) Prior Publication Data

US 2011/0211064 A1  Sep. 1, 2011

(30) Foreign Application Priority Data

Feb. 26, 2010 (JP) ................................. 2010-042464

(51) Int. Cl.
*H04N 7/18* (2006.01)
(52) U.S. Cl.
CPC ..................................... *H04N 7/18* (2013.01)
USPC ......................................................... 348/135
(58) Field of Classification Search
CPC .................................. H04N 7/18; H04N 9/31
USPC .......................................................... 348/135
See application file for complete search history.

(56) References Cited

U.S. PATENT DOCUMENTS

| | | | | |
|---|---|---|---|---|
| 7,237,911 B2* | 7/2007 | Yamada | .......................... | 353/121 |
| 7,341,188 B2* | 3/2008 | Aiki et al. | ...................... | 235/454 |
| 7,385,737 B2* | 6/2008 | Zaima | ............................ | 358/504 |
| 2007/0222792 A1* | 9/2007 | Matsuda | ........................ | 345/604 |
| 2007/0274588 A1* | 11/2007 | Jeong et al. | ................... | 382/181 |
| 2007/0291047 A1* | 12/2007 | Harville et al. | ............... | 345/589 |
| 2007/0291189 A1* | 12/2007 | Harville | ............................. | 349/7 |
| 2007/0291233 A1* | 12/2007 | Culbertson et al. | ............. | 353/34 |
| 2009/0091615 A1* | 4/2009 | Tan et al. | ....................... | 348/125 |
| 2010/0171930 A1* | 7/2010 | Kurosawa | ........................ | 353/30 |
| 2010/0265403 A1* | 10/2010 | Hikosaka | ....................... | 348/607 |
| 2010/0277655 A1* | 11/2010 | Sun | ................................. | 348/744 |
| 2010/0315601 A1* | 12/2010 | Furui | .............................. | 353/70 |
| 2011/0025982 A1* | 2/2011 | Takahashi | ....................... | 353/15 |

FOREIGN PATENT DOCUMENTS

JP    A-2009-86485    4/2009

* cited by examiner

*Primary Examiner* — Y Lee
*Assistant Examiner* — Irfan Habib
(74) *Attorney, Agent, or Firm* — Oliff PLC

(57) ABSTRACT

A correction information calculating device calculates correction information representing correspondence relationship between positions of pixels in an image projected onto projection areas of a projection surface from projectors each including an image forming element and positions of pixels in the image forming element. The correction information calculating device includes a correction information calculating unit that calculates the correction information by associating and comparing positions of a plurality of characteristic points defined in original data of the characteristic point patterns that includes the plurality of the characteristic points and is supplied to the projectors and the positions of the plurality of characteristic points inside the photographed image acquired by photographing the characteristic point patterns projected based on the original data based on a correspondence information representing the correspondence relationship between identification patterns on the projection surface and the projectors projecting the identification patterns.

20 Claims, 6 Drawing Sheets

CORRECTION INFORMATION CALCULATING DEVICE, IMAGE PROCESSING APPARATUS, IMAGE DISPLAY SYSTEM, AND IMAGE CORRECTING METHOD

BACKGROUND

1. Technical Field

The present invention relates to a correction information calculating device, an image processing apparatus, an image display system, and an image correcting method.

2. Related Art

Generally, as one example of an image display device, a projector is known. Projectors have advantages such as ease of installation and the ability to display a big screen image. Recently, image display systems displaying an image by using a plurality of projectors have been proposed. These image display systems display one image by composing a plurality of partial images by allowing a plurality of projectors to project the partial images.

In order to correct distortion of a partial image or a difference in the relative positions of partial images, for example, the following process is performed. First, a measurement pattern including characteristic points are displayed, and the displayed measurement pattern is photographed. Then, correction information representing the amount of correction of the positions of pixels is acquired based on the correspondence relationship between the position of a characteristic point on image data representing the measurement pattern and the position of the characteristic point in the photographed image acquired for each projector by photographing the measurement pattern. In a case where an image (hereinafter, referred to as a content image) for a viewer is displayed, image data representing the image is corrected based on the above-described correction information, and partial images are displayed based on the corrected image data.

In order to perform the above-described correction process, the correspondence information between the measurement pattern on a projection surface and a projector that projects the measurement pattern needs to be acquired (for example, see JP-A-2009-086485). In JP-A-2009-086485, identification images including different identification information for a plurality of projectors are projected from the projectors. Then, correspondence matching between the projectors and projected areas projected by the projectors is performed based on the identification images included in photographed images acquired by photographing the projected identification images.

In the technology disclosed in JP-A-2009-086485, since identification patterns corresponding to the number of used projectors are necessary, the number of projectors that can be used is limited to the number of the identification patterns prepared in advance. In addition, in order to increase the number of the identification patterns, the identification patterns become complicated shapes. In a case where the identification patterns have complicated shapes, there is a concern that a process for detecting the identification pattern from a photographed image may be complicated or the robustness of the process may be degraded due to a detection failure or the like.

SUMMARY

An advantage of some aspects of the invention is that it provides a correction information calculating device, an image processing apparatus, an image display system, and an image processing method capable of calculating correction information by acquiring the correspondence information between a measurement pattern on a projection surface and a projector, which has projected the measurement pattern, in a simple manner.

According to an aspect of the invention, there is provided a correction information calculating device that calculates correction information representing correspondence relationship between positions of pixels in an image projected onto projection areas of a projection surface from projectors each including an image forming element and positions of pixels in the image forming element. The correction information calculating device includes: a correspondence information determining unit that acquires correspondence information representing the correspondence relationship between identification patterns on the projection surface and the projectors projecting the identification patterns by comparing relative positions of identification diagrams in an array of a plurality of the identification patterns inside a photographed image acquired by photographing a plurality of the identification diagrams arranged on the projection surface when the identification patterns including the identification diagrams are projected from a plurality of the projectors and a disposition information representing correspondence relationship between relative positions of the projection areas in an array of a plurality of the projection areas according to the plurality of the projectors and the projectors projecting an image onto the projection areas; and a correction information calculating unit that calculates the correction information by associating and comparing positions of a plurality of characteristic points defined in original data of the characteristic point patterns that includes the plurality of the characteristic points and is supplied to the projectors and the positions of the plurality of characteristic points inside the photographed image acquired by photographing the characteristic point patterns projected based on the original data based on the correspondence information.

According to the above-described correction information calculating device, the correspondence information determining unit acquires the correspondence information representing the correspondence relationship between each identification pattern on the projection surface and the projector that has projected the identification pattern by comparing the disposition of each identification diagram occupying an array of a plurality of identification patterns inside a photographed image and the disposition information representing the correspondence relationship between each projection area and the projector that projects an image onto the projection area. Accordingly, the correspondence information can be acquired in a simple manner. In addition, the correspondence information can be acquired by acquiring the disposition of each characteristic diagram occupying the array of the identification diagrams. Thus, the degree of necessity of changing the shapes of the identification diagrams for the plurality of the projectors is lowered, and the correspondence information can be acquired even in a case where the same identification diagram is projected. Accordingly, the number of used projectors is not limited to the type of the identification diagram, whereby the convenience is improved. In addition, the correction information calculating unit calculates the correction information by comparing the original data of the characteristic point pattern and the characteristic point pattern located inside the photographed image based on the correspondence information that is acquired by the correspondence information determining unit. As a result, a correction information calculating device capable of efficiently calculating the correction information is acquired.

The above-described correction information calculating device may further include: a first pattern detecting unit that detects the identification patterns inside the photographed image acquired by photographing measurement patterns on the projection surface at a time when the plurality of the projectors projects the measurement patterns including characteristic point patterns and the identification patterns; and a second pattern detecting unit that detects the plurality of the characteristic points included in the characteristic point patterns inside the photographed image. In this case, the correspondence information determining unit acquires the correspondence information based on a detection result of the first pattern detecting unit, the second pattern detecting unit detects the characteristic point patterns by referring to the relative positions of the characteristic point patterns with respect to the identification patterns defined in the original data of the measurement patterns by using the correspondence information, and the correction information calculating unit acquires the correction information based on a detection result of the second pattern detecting unit.

In such a case, the correspondence information is acquired by using the measurement pattern including the identification pattern and the characteristic point pattern, and the correction information is acquired by using the measurement pattern and the correspondence information. Accordingly, compared to a case where the characteristic point pattern is projected separated from the identification pattern, the effort and the time required for projection or photographing can be reduced. In addition, the second pattern detecting unit detects the characteristic point pattern by using the correspondence information. Accordingly, the probability of failing to detect the characteristic point included in the characteristic point pattern is lowered, and divergence of the process due to failure of detection of the characteristic point can be avoided.

In addition, in the above-described correction information calculating device, the disposition information may be information that represents the relative positions of the projectors in the array of the plurality of the projectors at a time when the relative positions of the projectors in the array of the plurality of the projectors coincide with the relative positions of the projection areas of the projectors in the array of the plurality of the projection areas.

In such a case, the disposition information can be set in a simple manner. Accordingly, the effort and the time required for acquiring the correction information can be reduced.

In addition, in the above-described correction information calculating device, the shapes of the identification diagrams included in the identification patterns that are projected by the plurality of the projectors may be the same for the plurality of the projectors.

As described above, since the correspondence information can be acquired by detecting the disposition of each identification diagram in the array of the identification diagrams, the correspondence information can be acquired even in a case where the shapes of the identification diagrams are the same for the plurality of the projectors. In such a case, compared to a case where the shapes of the identification diagrams are different for the plurality of the projectors, the cost required for generating and storing the identification patterns can be reduced. In addition, the identification diagram can be detected based on the same algorithm for the array of the plurality of the identification diagrams, and accordingly, the process of detecting the identification diagram can be performed stably and efficiently.

In addition, in the above-described correction information calculating device, it may be configured such that the identification diagram includes a plurality of the characteristic points, and the correction information calculating unit calculates the correction information by using the identification patterns inside the photographed image that are acquired by photographing the identification patterns projected by the projectors.

In such a case, the degree of necessity for using a pattern including different identification diagrams is lowered, and accordingly, the effort and the time required for analyzing the projected pattern can be reduced.

According to another aspect of the invention, there is provided an image processing apparatus including: the above-described correction information calculating device; and an image correcting unit that corrects image data such that an image projected onto the projection surface by projectors based on the image data after correction approximately coincides with an image represented by the image data before correction by referring to correction information calculated by the correction information calculating device.

According to the above-described correction information calculating device, the correction information is efficiently acquired. Therefore, the above-described image processing apparatus can correct the distortion of partial images or a difference between relative positions of the partial images without effort for acquiring the correction information.

According to still another aspect of the invention, there is provided an image display system including: the above-described image processing apparatus; and a plurality of projectors that projects an image based on image data after correction that is corrected by the image processing apparatus.

According to the above-described image processing apparatus, the correction information is efficiently calculated, and the distortion of partial images and a difference between the relative positions of the partial image can be corrected with high precision based on the correction information. Therefore, the above-described image display system has a high degree of convenience and can display a high-quality image.

According to yet another aspect of the invention, there is provided an image processing method including: calculating correction information representing correspondence relationship between positions of pixels in an image projected onto projection areas of a projection surface from projectors each including an image forming element and positions of pixels in the image forming element; and correcting image data such that an image projected onto the projection surface by projectors based on the image data after correction approximately coincides with an image represented by the image data before correction by referring to correction information. The calculating of correction information includes: a process of acquiring correspondence information representing the correspondence relationship between identification patterns on the projection surface and the projectors projecting the identification patterns by comparing relative positions of identification diagrams in an array of a plurality of the identification patterns inside a photographed image acquired by photographing a plurality of the identification diagrams arranged on the projection surface when the identification patterns including the identification diagrams are projected from a plurality of the projectors and a disposition information representing correspondence relationship between relative positions of the projection areas in an array of a plurality of the projection areas according to the plurality of the projectors and the projectors projecting an image onto the projection areas; and a process of calculating the correction information by associating and comparing positions of a plurality of characteristic points defined in original data of the characteristic point patterns that includes the plurality of the characteristic points and is supplied to the projectors and the positions of the plurality of characteristic points inside the photographed image acquired by photographing the characteristic point patterns projected based on the original data based on the correspondence information.

According to the above-described image processing method, the correspondence information can be acquired in a simple manner based on the above-described reasons, and the correction information can be efficiently calculated. Therefore, the distortion of partial images or a difference between the partial images can be corrected without the effort required for acquiring the correction information.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
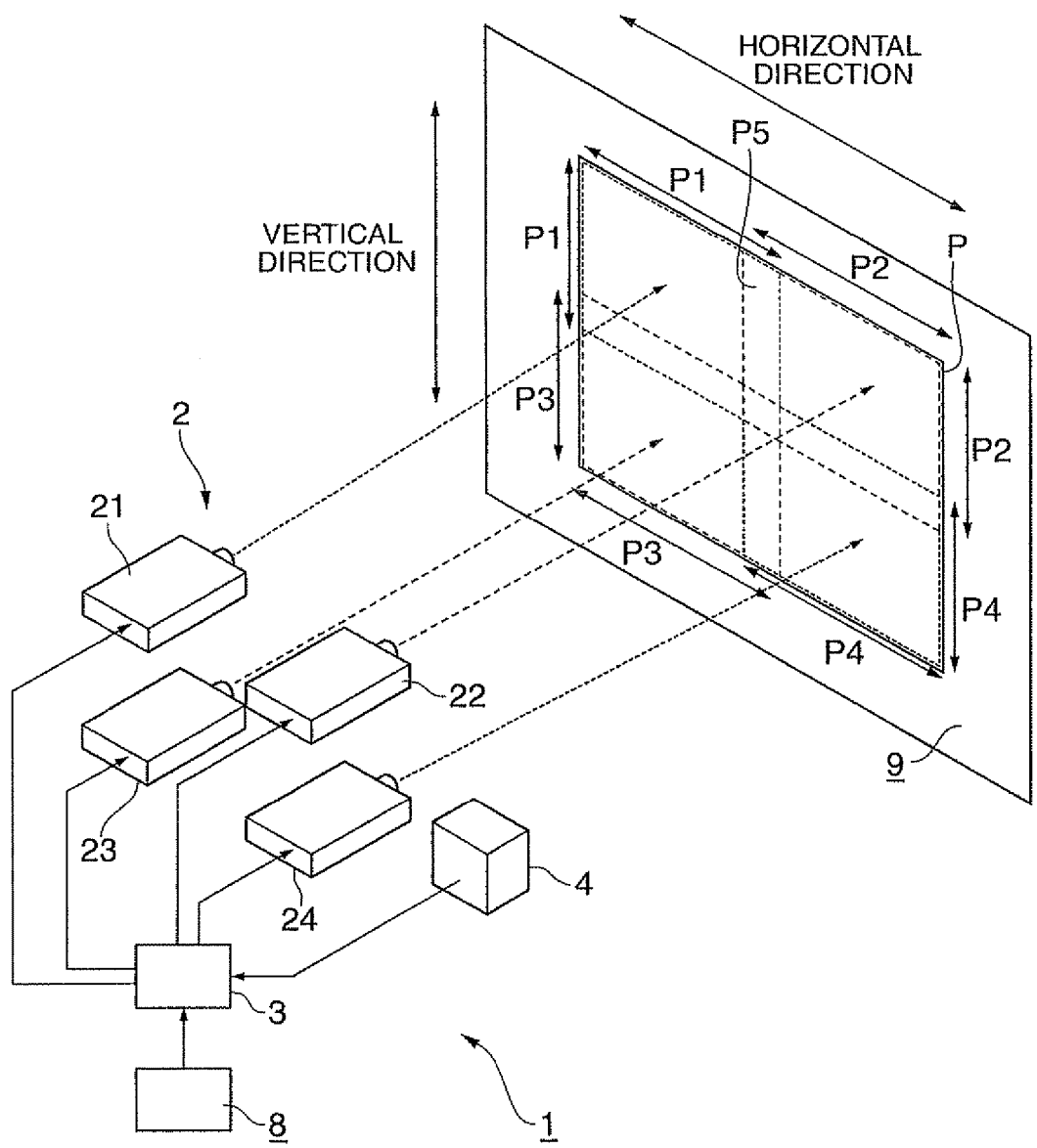
FIG. 1 is a schematic diagram showing an image display system according to an embodiment of the invention.

Hereinafter, embodiments of the invention will be described with reference to the accompanying drawings. In the drawings referred to, in order to represent characteristic parts to be easily understood, the size and the scale of a structure may be differently shown in the figures. In addition, to the same constituent elements, the same reference numeral is assigned, and detailed description thereof may be omitted.

Figure 2:
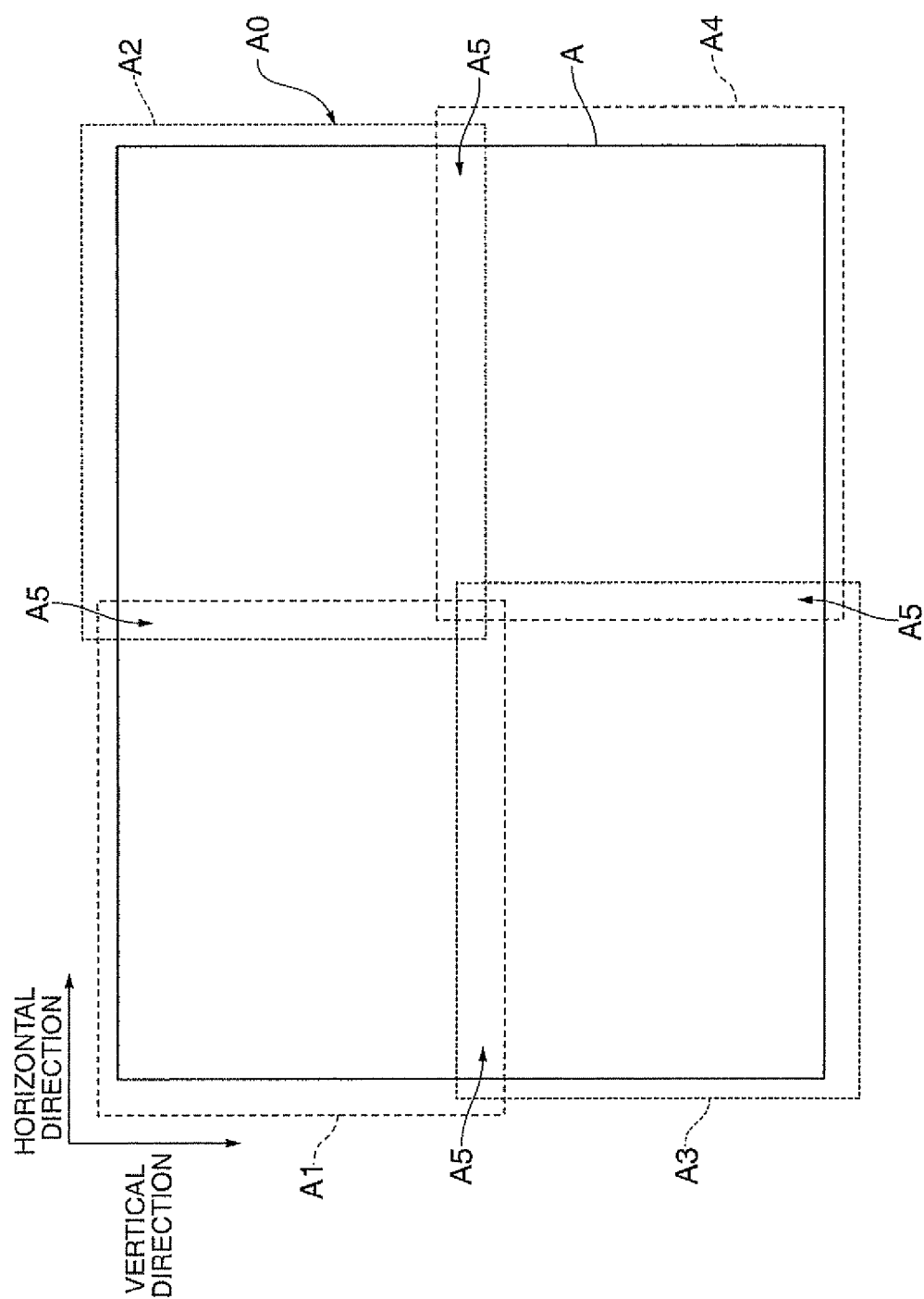
FIG. 2 is an explanatory diagram showing the positional relationship of a projection area on a projection surface.

FIG. 1 is a conceptual diagram of an image display system according to an embodiment of the invention. FIG. 2 is an explanatory diagram showing the relationship between an image projected onto a projection surface and a projection area.

As shown in FIG. 1, the image display system 1 includes a plurality of projectors 2, an image processing apparatus 3, and a photographing device 4. The image display system 1 projects a content image P, for example, represented by image data input from a signal source 8 onto a projection surface 9 such as a screen or a wall by using a plurality of projectors 2 in a sharing manner. Here, it is assumed that a first projector 21, a second projector 22, a third projector 23, and a fourth projector 24 are provided as the plurality of projectors 2. Here, the number or the arrangement of the projectors is not particularly limited as long as a plurality of the projectors is used. In the description presented below, an image projected by each of the plurality of projectors may be referred to as a "partial image". In addition, in the description presented below, image data representing the partial image may be referred to as "partial image data".

The projector 2 can display an image (here, a partial image) based on supplied image data (here, partial image data). The configuration of the projector is not particularly limited. For example, the projector 2 may be a single plate-type projector or a projector such as a three plate-type projector that includes a plurality of image forming devices. In addition, the projector 2 may be a front projection-type that projects an image onto the projection surface 9 from the viewer side or a rear projection-type that projects an image from a side opposite to the viewer with the projection surface 9 interposed therebetween.

Each of the plurality of projectors 2 according to this embodiment includes a light source, an image forming device, and a projection optical system. The image forming device has a plurality of pixels that is two-dimensionally arranged. Examples of the image forming device include a transmission-type or reflection-type liquid crystal light valve, a digital mirror device (DMD), or the like. In each projector, light emitted from the light source is incident to the image forming device. The image forming device independently controls the plurality of pixels based on data for each pixel (hereinafter, referred to as pixel data) out of the partial image data that is input to the projector. The light incident to the pixel is modulated for each pixel so as to be light having light intensity defined by the pixel data. The light modulated by the plurality of pixels forms an optical image (image) as a whole, and this optical image is projected onto the projection surface 9 by the projection optical system. Here, in the plurality of projectors, the number of pixels of the image forming devices and the arrangement of the pixels are the same.

The projection area that is an area in which each projector can project an image onto the projection surface 9 is set differently for the plurality of the projectors 2. As shown in FIG. 2, the first to fourth projection areas A1 to A4 are set such that edge portions thereof overlap one another and form a total projection area as a whole. In other words, each of the first to fourth projection areas A1 and A4 includes an overlapping area P5 that overlaps another projection area that is adjacent thereto.

The projection area (the first projection area A1) of the first projector 21 is aligned with the projection area (the second projection area A2) of the second projector 22 in the horizontal direction on the projection surface 9. In this horizontal direction, the end portion of the first projection area A1 overlaps the end portion of the second projection area A2. The positional relationship between the projection area (the third projection area A3) of the third projector 23 and the projection area (the fourth projection area A4) of the fourth projector 24 in the, horizontal direction is similar to that between the first and second projection areas A1 and A2 in the horizontal direction.

The first projection area A1 is aligned with the third projection area A3 in the vertical direction that is perpendicular to the horizontal direction on the projection surface 9. In this vertical direction, the end portion (the edge portion) of the first projection area A1 overlaps the end portion (the edge portion) of the third projection area A3. The positional relationship between the second projection area A2 and the fourth projection area A4 in the vertical direction is similar to that between the first and third projection areas A1 and A3 in the vertical direction.

In this embodiment, as shown in FIG. 1, the plurality of projectors 2 is two-dimensionally arranged. The relative positions of the projectors 21 to 24 in the arrangement of the plurality of projectors 2 coincide with the relative positions of the projection areas A1 to A4 in the arrangement of a plurality of projection areas on the projection surface 9. The relative position mentioned here indicates relative positional relationship of another arrangement element with respect to a reference arrangement element when one arrangement element in the arrangement in which a plurality of arrangement elements (projectors or projection areas) is aligned is used as the reference. For example, when the relative positions of the projectors along the horizontal direction are considered, the first projector 21 is located to the left side of the second projector 22, and the second projector 22 is located to the right side of the first projector 21. At this time, regarding the relative positions of the projection areas along the horizontal direction, the first projection area A1 for which the first projector 21 is responsible is located to the left side of the second projection area A2 for which the second projector 22 is responsible, and the second projection area A2 for which the second projector 22 is responsible is located to the right side of the first projection area A1 for which the first projector 21 is responsible. In addition, the "left side" and the "right side" represent the positional relationships between the projectors 21 to 24 and the plurality of the projection areas A1 to A4 in a case where the plurality of projectors 2 and the plurality of projection areas A1 to A4 are seen from the opposite side of the projection surface 9 with the plurality of projectors 2 interposed therebetween. Also for the vertical direction, the relative position of each projector and the relative position of the projection area for which the projector is responsible are not reversed.

However, generally, the outer shape of the total projection area A0 is not formed in a rectangular shape. The reason for this is that there is distortion or a difference in the relative positions of the first to fourth projection areas A1 to A4 due to arrangement of the first to fourth projectors 21 to 24. Here, an approximately rectangular area fitted in the total projection area A0 is set as the area (an effective projection area A) that is used for actual projection of an image. The first to fourth projectors 21 to 24 project the partial images in an area of the projection areas that, is fitted in the effective projection area A.

For example, a first partial image P1 is displayed in an area of the first projection area A1 that is fitted in the effective projection area A in accordance with light projected from the first projector 21. Similarly, second to fourth partial images P2 to P4 are displayed by the second to fourth projectors 22 to 24. The first to fourth partial images P1 to P4 are displayed onto the projection surface 9 with end portions thereof overlapping each other and configure the content image P as a whole.

Referring back to FIG. 1, the image processing apparatus 3 receives image data representing the content image P, for example, from the signal source 8. The image processing apparatus 3 performs various processes (to be described later) for the image data and generates a plurality of the partial image data sets based on the image data. Each partial image data set is data representing any one of the first to fourth partial images P1 to P4. The image processing apparatus 3 supplies the partial image data representing the partial image of each projector to the first to fourth projectors to 24. The first to fourth projectors 21 to 24 project the first to fourth partial images P1 to P4 on the projection surface 9 based on the partial image data input from the image processing apparatus 3.

The image processing apparatus 3 performs a process (hereinafter, referred to as a position correcting process) of correcting the image distortion of each of the first to fourth partial images P1 to P4 and differences of the relative positions of the first to fourth partial images P1 to P4, as one of the above-described various processes. The image processing apparatus 3 calculates correction information that is used for the position correcting process at an appropriately selected timing such as at the time of installation of the image display system 1 or at the time of maintenance when a predetermined period elapses from the time of installation of the image display system 1.

As one example of the image distortion, for example, there is image distortion (for example, keystone distortion) that occurs in accordance with an elevation angle or a depression angle in each projection direction of the first to fourth projectors 21 to 24 with respect to the projection surface 9, that is, the vertical direction, a swing angle in the horizontal direction, or the like. As another example of the image distortion, there is image distortion that occurs due to local distortion of the projection surface 9, for example, caused by deflection or the like of a cloth-formed screen.

The differences in the relative positions of the first to fourth partial images P1 to P4 are, for example, due to discordance of the projection directions, misalignment of the relative positions, or the like of the first to fourth projectors 21 to 24.

The image processing apparatus according to the embodiment of the invention can have various forms such as the following first to third forms.

As an image processing apparatus of the first form, a configuration that is configured by one or more logic circuits such as an ASIC that performs various processes may be used. A part or the whole of the image processing apparatus of the first form may be integrated with any of the first to fourth projectors 21 to 24, the photographing device 4, and the signal source 8.

As an image processing apparatus of the second form, a configuration of a computer in which a program is installed may be used. In other words, by allowing a computer to perform various processes in accordance with a program, the function of the image processing apparatus 3 can be realized. For example, by performing the operation of each process using a memory and a CPU in a cooperative manner, storing the result of the operation in a memory unit such as a hard disk or a memory, and reading out the result of the operation and providing the result to another process as necessary, the same result of the process as in a case where a logic circuit or the like is used can be acquired. In addition, in the image processing apparatus 3 of the second form, various processes may be performed by a plurality of computers in a sharing manner.

As an image processing apparatus of the third form, a configuration in which a logic circuit performing a part of the various processes and a computer performing the other parts of the various processes in accordance with a program are combined may be used.

In this manner, an image processing apparatus according to an embodiment of the invention may also have a form as a set of a plurality of functional units each performing a part of various processes, other than the form of an independent device performing various processes. In other words, a form in which a plurality of functional units is divided into a plurality of separate devices, and the functional units perform the processes in a cooperative manner may be used.

The photographing device 4 can acquire a photographed image that is acquired by photographing an area, which includes the entirety of the total projection area A0, on the projection surface 9. The photographing device 4, for example, is configured by a two-dimensional image sensor such as a CCD camera. The two-dimensional image sensor has a structure in which a plurality of light receiving elements formed from photo diodes or the like is two-dimensionally arranged. When the correction information is calculated, the photographing device 4 photographs the measurement patterns projected on the projection surface 9 by the first to fourth projectors 21 to 24 and outputs photographed image data representing the photographed image to the image processing apparatus 3.

The photographing device 4 of this embodiment is arranged such that the entirety of the total projection area A0 can be photographed by performing one photographing operation. Compared to a case where the entirety of the total projection area A0 is photographed by adjusting photographed images acquired by several photographing operations, an error due to movement of the photographing device between photographing operations can be eliminated. Depending on the size or the aspect ratio of the total projection area A0, the entirety of the total projection area A0 may not fit in the viewing angle of the photographing device. In such a case, a photographed image that is acquired by photographing the entirety of the total projection area A0 may be acquired by photographing parts of the total projection area A0 in the state in which the relative position of the photographing device with respect to the projection surface 9 is approximately fixed by mounting the photographing device on a tripod or the like and combining results of two or more photographing operations.

When a content image P is displayed by a plurality of projectors 2 as above, the content image P can be displayed with high resolution and high luminance on a big screen. For example, compared to a case where a content image is displayed by one projector, under a condition that the number of pixels of each projector is the same, the content image P can be displayed on a big screen without decreasing the resolution. On the other hand, when compared under a condition that a content image P is displayed with the same screen size, the number of pixels can be increased in accordance with the number of the projectors, whereby the content image can be displayed with high resolution. In addition, when compared under a condition that the intensity of output light of each projector is the same, the intensity of light contributing to display can be increased in accordance with the number of the projectors, whereby the content image P can be displayed with high luminance.

When compared to a technique of increasing the number of pixels or the output level of the projector for acquiring the above-described advantages, the cost of each projector can be dramatically reduced. Accordingly, a decrease in the cost of the device can be expected even when the number of projectors is increased. In addition, it is possible for the projectors to be installed and used in different places (for example, conference rooms) for an ordinary use, and an image display system is built, for example, at a main conference room in accordance with the use so as to display a content image with high resolution and high luminance on a big screen. As above, whether the projectors are individually used or a plurality of the projectors is used in a combined manner can be selected in accordance with the use. Accordingly, compared to a case where the above-described advantages are to be acquired by using one projector, the convenience is improved.

In addition, since the content image P is displayed based on the image data for which the position correcting process has been performed by the image processing apparatus 3, image distortion of each partial image and a difference in the relative positions of a plurality of the partial images are decreased. Thus, since the content image P can be displayed in a state in which image distortion is small, and where it is difficult to recognize the joining portions of the partial images, the content image P can be displayed as an image having high quality. According to an embodiment of the invention, in a case where the correction information is calculated, the correspondence relationship between a measurement pattern projected onto the projection surface and the projector projecting the measurement pattern can be acquired in a simple manner. Therefore, the effort and time required for installation, for example, of an image display system can be decreased, whereby the convenience of the image display system can be improved.

Figure 3:
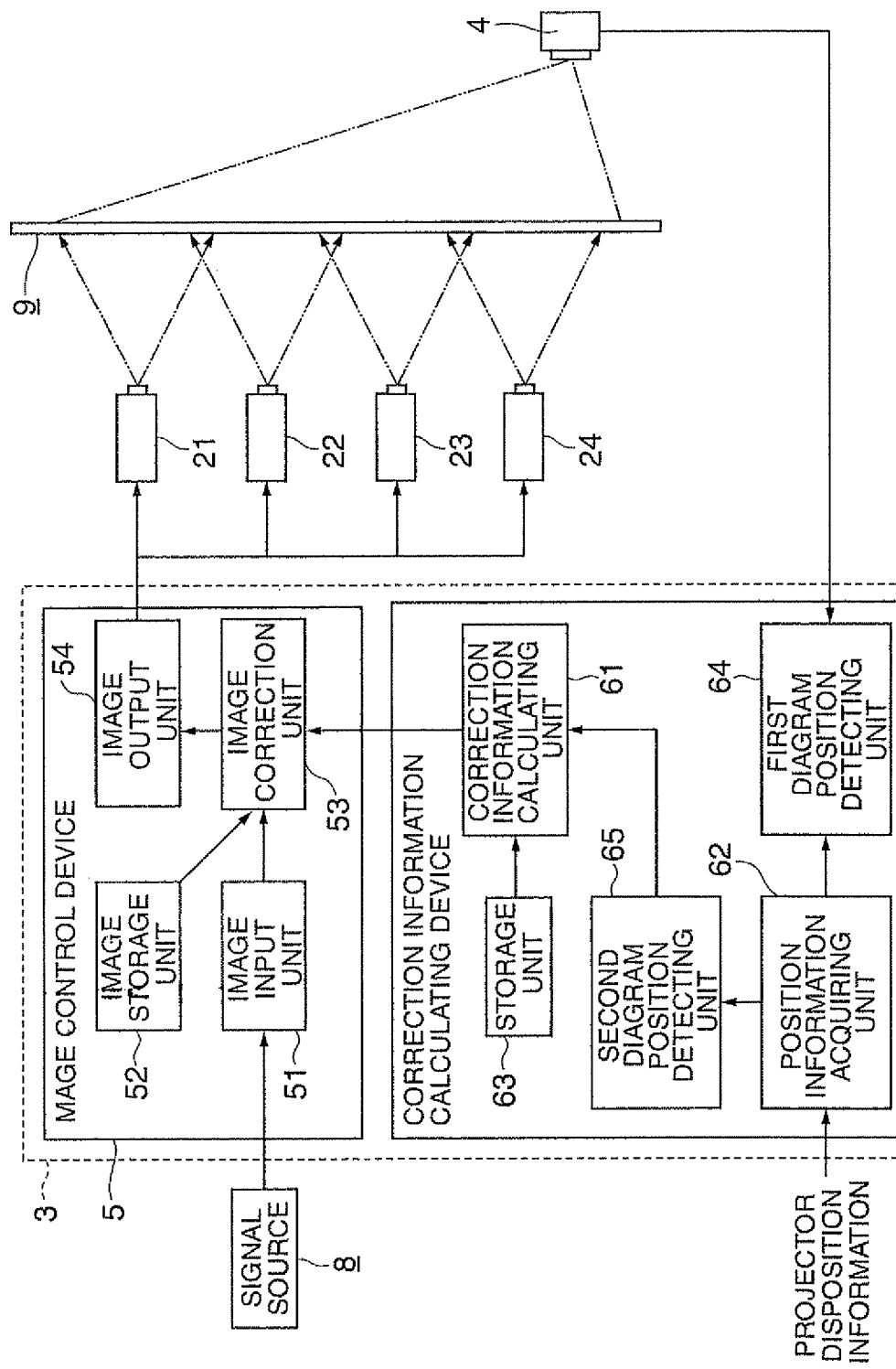
FIG. 3 is a diagram showing the configuration of the image display system.
Figure 4:
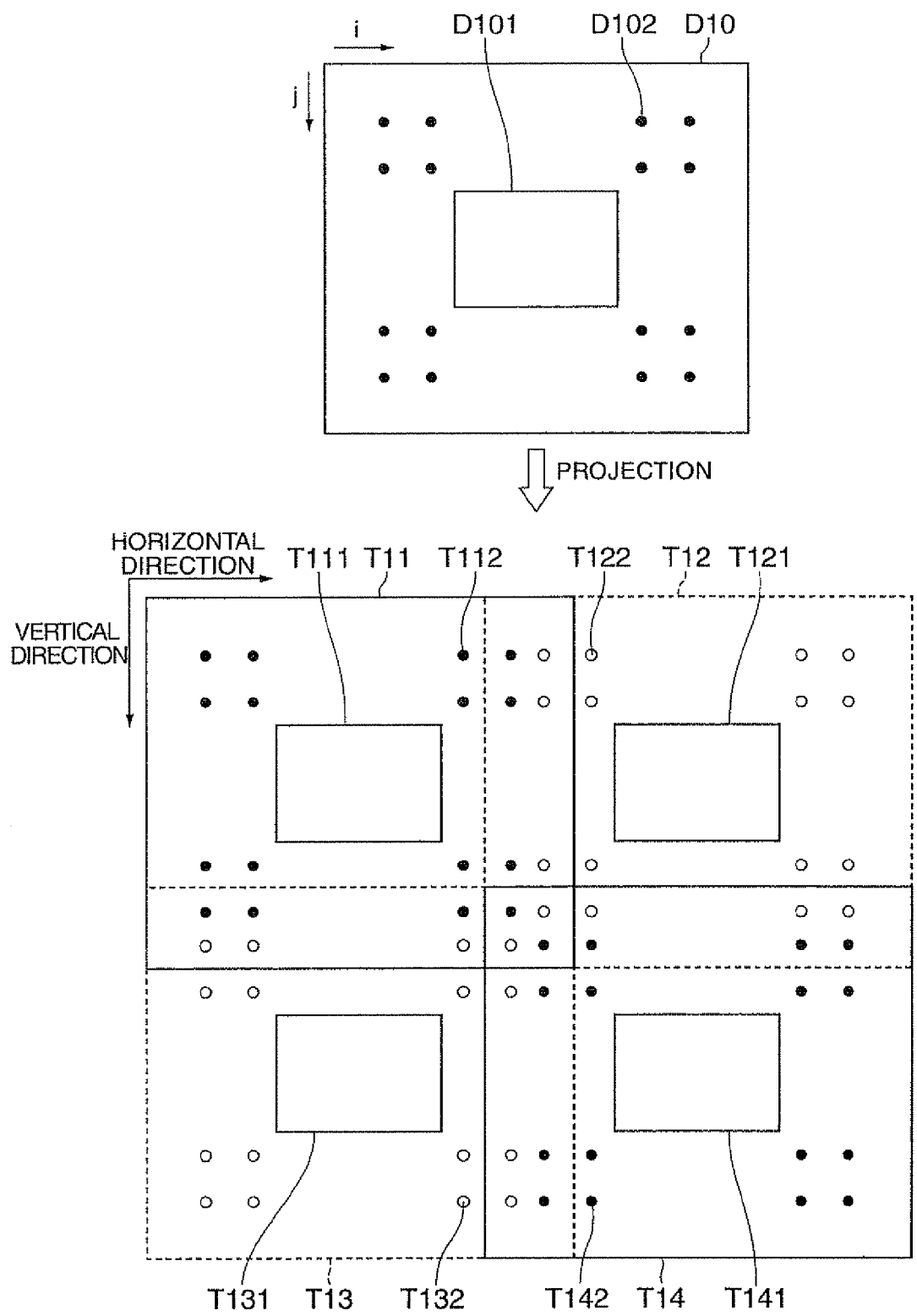
FIG. 4 is an explanatory diagram illustrating one example of a measurement pattern.

Next, the constituent elements of an image processing apparatus 3 according to an embodiment of the invention will be described in detail with reference to FIGS. 3 and 4. FIG. 3 is a diagram showing the functional configuration of the image processing apparatus 3. FIG. 4 is an explanatory diagram illustrating an example of the measurement pattern.

As shown in FIG. 3, the image processing apparatus 3 includes an image control device 5 and a correction information calculating device 6. The correction information calculating device 6 acquires the correspondence relationship between a measurement pattern projected onto the projection surface and the projector projecting the measurement pattern and calculates the correction information based on the correspondence information. The image control device 5 performs various processes and performs a position correcting process for image data using the correction information as one of the various processes. According to this embodiment, the image control device 5 is configured as a part of a first computer, and the correction information calculating device 6 is configured by using a CPU, a memory unit, and the like of a second computer that is configured to be separate from the first computer.

The image control device 5 includes an image input unit 51, an image storage unit 52, an image correction unit 53, and an image output unit 54. The image input unit 51 is configured, for example, by a video capture board or the like. The image input unit 51 receives a content image from a signal source 8 such as a DVD player or a communication device that is disposed outside the image control device 5 as is necessary. The image storage unit 52 is configured, for example, by a storage device such as a hard disk that is built in a computer or is externally disposed and can store image data that represents a content image P. The image data input to the image input unit 51 or the image data stored in the image storage unit 52 is output to the image correction unit 53 in a case where a content image P is displayed.

In addition, the image control device 5 may have a configuration in which only one of the image input unit and the image storage unit 52 is arranged. Furthermore, a configuration may be used in which the image data input from the image input unit 51 is stored in the image storage unit 52, and the image data is appropriately read out so as to be input the image correction unit 53.

The image correction unit 53 includes a calculation section and a memory section, of which a detailed configuration is not shown in the figure. The calculation section is configured, for example, by a graphic processing unit (GPU) or the like. The memory section is configured by a video memory (VRAM), a non-volatile memory, or the like. The image correction unit 53 corrects the image data input from the signal source 8 by referring to the correction information such that an image projected onto the projection surface 9 by the projectors 21 to 24 based on image data after correction approximately coincides with an image represented by the image data before correction.

The calculation section performs various processes such as gamma correction, color correction, and the like for the image data input to the calculation section while using the memory section as an image buffer or the like. The various processes may be performed through calculation of a CPU of the computer by using a program, instead of the GPU. In addition, there may be a case where the arrangement of the pixels on the image data input from the image input unit 51 or the image storage unit 52 does not match the arrangement of the pixels of the image forming element of the projector 2, for example, a case where the number of pixels included in the image data is different from that of the image forming element. In such a case, the calculation section corrects the image data such that image data after correction matches the arrangement of the pixels of the image forming element by performing an interpolation process, a rendering process, or the like for the input image data. It may be configured such that a process unit is disposed in each projector, and the above-described process is performed by the process unit for each projector.

The calculation section performs a position correcting process for the image data by referring to the correction information and generates partial image data. The correction information is stored in the storage unit (for example, a non-volatile memory). The correction information is information that represents the correspondence relationship between the position of each pixel occupying the total projection area A0 (see FIG. 2) on the projection surface 9 and the position of each pixel occupying the arrangement of the pixels of the image forming elements of the plurality of projectors 2.

The correction information, for example, is stored in a table format as values of pixels of the image forming element. In other words, by referring to the table (the correction information), a pixel of the image forming element to which each image data set is input for displaying a predetermined pixel in a predetermined position on the total projection area A0 can be known.

The calculation section, in order to display an image represented by the image data before correction which is performed through the position correcting process, that is, a content image to be displayed in the effective projection area A, for example, performs the process as below. For each pixel (hereinafter, referred to as a non-display pixel) that is disposed inside the total projection area A0 but is disposed on the outside of the effective projection area A, the calculation section sets data supplied to each pixel of the image forming element that corresponds to each non-display pixel through the correction information to non-display mask data (for example, data representing black). In addition, for each pixel (hereinafter, referred to as a display pixel) that is disposed inside the effective projection area A, the calculation section sets data supplied to the pixel of the image forming element that corresponds to the display pixel through the correction information to data that is defined in image data as pixel data for a display pixel. By performing such a process for display pixels and non-display pixels that are included in each projection area, partial image data for a projector responsible for the projection area can be acquired. The image correction unit 53 outputs the partial image data that is generated by the calculation section to the image output unit 54.

The image output unit 54 has a plurality of external connection connectors, and the projectors are connected to the external connection connectors. An identifier (ID) is assigned to each external connection connector. The image output unit 54 outputs the partial image data output from the image correction unit 53 to the projector that is responsible for each partial image data set. An external connection connector through which specific partial image data is output can be set by the first computer. The image output unit 54 outputs the partial image data representing the first partial image P1 through the external connection connector to which the first projector 21 is connected. Similarly, the image output unit 54 outputs the partial image data representing the second to fourth partial images P2 to P4 to the second to fourth projectors 22 to 24.

The correction information calculating device 6 of this embodiment realizes the function by allowing the second computer to perform a predetermined process (to be described later) by using a program. The second computer is formed to be separate from the first computer in which the image control device 5 is installed and is electrically connected to the first computer, for example, through a bus cable or the like. It may be configured such that, after the correction information is calculated by the correction information calculating device 6, the correction information is output to the image control device 5 through a bus cable, and then, a content image P is displayed by using the plurality of the projectors 2 and the image control device 5 in a state in which the second computer (the correction information calculating device 6) and the photographing device 4 are detached. In addition, it may be configured such that, when there is displacement of the position in the projector 2, the second computer (the correction information calculating device 6) and the photographing device 4 are installed again, the correction information is recalculated, and the correction information is updated.

The correction information calculating device 6 includes a correction information calculating unit 61, a correspondence information determining unit 62, a storage unit 63, a first pattern detecting unit 64, and a second pattern detecting unit 65 as functional blocks. The storage unit 63 is configured by a hard disk or a memory of the second computer. In the storage unit 63 of this embodiment, measurement image data (original data) that represents a measurement pattern used for calculating the correction information is stored. The measurement image data may be stored in the storage unit of the first computer or another storage unit.

As shown in FIG. 4, the measurement pattern D10 is an image that includes a first pattern D101 as an identification pattern and a second pattern D102 as a characteristic point pattern. In this embodiment, measurement image data representing the same measurement pattern D10 is supplied to any of the first to fourth projectors 21 to 24. Accordingly, the shape of an identification diagram that is included in the identification pattern projected by each of the plurality of projectors 2 is the same for the plurality of projectors 2.

The measurement pattern D10 is configured by an arrangement of pixels that are arranged in the direction of "i" and the direction of "j". The image data representing the measurement pattern (hereinafter, referred to as measurement image data) is formed so as to match the arrangement of the pixels of the image forming element in a step in which the measurement data is supplied to each projector. For example, in a case where the arrangement of the pixels of the image forming element is 1920×1080, the measurement image data is supplied to the projector as the image data of an image in which 1920 pixels are aligned in the direction of "i" and 1080 pixels are aligned in the direction of "j".

A first pattern D101 of this example is configured by one rectangular identification diagram. The position of the first pattern D101 that occupies the measurement pattern D10 is set such that the identification diagram is projected in an area not overlapping the overlapping area A5 shown in FIG. 2. More specifically, the position and the size of the first pattern D101 that occupies the measurement pattern D10 are set by adding a set value of the overlapping amount of the overlapping area A5. The amount of overlapping, when one pair of the projection areas are aligned in a predetermined direction (for example, the horizontal direction), can be represented by a ratio of the width of one projection area in the predetermined direction to the width of an overlapping area between the one pair of projection areas or the like. The identification diagram of this example is arranged near the center of the measurement pattern D10, and the measurement image data is set such that the center point of the measurement pattern is located inside the identification diagram.

A second pattern D102 is configured by a plurality of dot-shaped (spot-shaped) characteristic diagrams and includes four or more characteristic points that are defined by the plurality of characteristic diagrams. In this example, the plurality of characteristic diagrams configuring the second pattern D102 is arranged on the outer side of the first pattern D101. The characteristic diagram is a diagram of a shape or a luminance distribution that can be detected by using image processing technology such as an edge detecting process or a pattern recognizing process. When the characteristic diagram is detected, points representing the characteristic diagram can be acquired as characteristic points.

For example, in a case where the characteristic diagram has a dot shape, by detecting the contour of the dot shape or a luminance distribution by using the above-described image processing technology, the center point of the dot shape is acquired, and the center point may be used as the characteristic point. On the other hand, in a case where the characteristic diagram has a rectangular shape, four apexes can be used as the characteristic points in addition to using the center point as the characteristic point, similarly to the case of a dot shape. In other words, segments corresponding to each side of the rectangular shape can be detected by half conversion or the like, and four apexes that are intersections of the detected segments can be acquired as the characteristic points. In other words, the first pattern D101 can be used as a characteristic diagram including four characteristic points.

The identification diagram configuring the first pattern D101 may be set as a diagram that can be detected by using the image processing technology more easily than the characteristic diagram configuring the second pattern D102. Generally, a diagram to be detected can be more easily detected as the size of the diagram is increased, that is, the ratio of the size of the characteristic diagram to the size of the measurement pattern is increased. In addition, as a diagram to be detected has a simpler shape (for example, a rectangular shape or a circular shape), an abrupt change in the brightness on the edge becomes more remarkable, whereby the diagram can be easily detected. In this example, the identification diagram is larger than the characteristic diagram, and accordingly, the identification diagram can be easily detected.

The measurement pattern D10 projected by the first projector 21 represents a projection measurement pattern T11 projected in the first projection area A1. The projection measurement pattern T11 includes a first projection pattern T111 corresponding to the first pattern D101, and a second projection pattern T112 corresponding to the second pattern D102. Similarly, the measurement patterns D10 projected by the second to fourth projectors represent projection measurement patterns T12 to T14 in the second to fourth projection areas A2 to A4. The projection measurement patterns T12 to T14 include first projection patterns T121, T131, and T141 corresponding to the first pattern D101 and second projection patterns T122, T132, and T142 corresponding to the second pattern D102.

Returning to the description presented with reference to FIG. 3, the correction information calculating unit 61, the correspondence information determining unit 62, the first pattern detecting unit 64, and the second pattern detecting unit 65 are configured by the CPU, the memory, and the like of the second computer. The correction information calculating unit 61 calculates the correction information by associating and comparing the positions of a plurality of characteristic points defined in the original data of the characteristic point pattern and the positions of a plurality of characteristic points inside a photographed image acquired by photographing the characteristic point pattern, which is projected based on the original data, based on the correspondence information. When calculating the correction information, the correction information calculating unit 61 reads out the measurement image data that is stored in the storage unit 63 and directly or indirectly outputs the measurement image data to each projector. Here, the correction information calculating unit 61 outputs the measurement image data to the image correction unit 53 of the image control device 5. The measurement image data is indirectly output to each projector through the image control device 5. The image control device 5 corrects the measurement image data in a format matching the arrangement of the pixels of the image forming element as is necessary. The first to fourth projectors 21 to 24 project the measurement pattern onto the projection surface 9 based on the supplied measurement image data.

The first pattern detecting unit 64 receives photographed image data representing a photographed image acquired by photographing a measurement pattern projected onto the projection surface 9. The first pattern detecting unit 64 detects the measurement pattern (hereinafter, referred to as a photographed pattern) transferred to the photographed image, for example, by performing an edge process, a pattern recognizing process, or the like for the photographed image data. The first pattern detecting unit 64 stores the image data representing the detected photographed pattern in the storage unit 63. The photographed pattern includes the identification diagrams corresponding to the number (here, four) of the projectors. The first pattern detecting unit 64 detects the identification diagrams included in the photographed pattern and outputs data (hereinafter, it may be referred to as "array information of identification diagrams") representing the arrangement of the detected identification diagrams to the correspondence information determining unit 62. The first pattern detecting unit 64 of this embodiment detects four apexes of the rectangular-shaped identification diagram by using half conversion and outputs a set of data representing the positions of the four apexes as the array information of each identification diagram. As above, the first pattern detecting unit 64 detects identification patterns inside the photographed image acquired by photographing the measurement pattern on the projection surface 9 at a time when the measurement patterns including the characteristic point pattern and the identification pattern are projected by the plurality of projectors 2.

The correspondence information determining unit receives the disposition information of the projectors, compares the received disposition information with the array information of the identification diagrams that is output from the first pattern detecting unit 64, and acquires correspondence information that represents the correspondence relationship between each identification pattern on the projection surface and the projector projecting each identification pattern. The above-described disposition information is information that represents the correspondence relationship between the relative position of each projection area in the arrangement of the first to fourth projection areas A1 to A4 and the projector projecting an image onto each projection area. The disposition information includes the relative position of the projection area, for which each projector is responsible, in the horizontal direction and the relative position of the projection area in the vertical information as information on each projector.

For example, a projection area (for example, the first projection area A1), which is located on the corner of the array of the projection areas is used as a reference, and the relative position of the projection area for which each projector is responsible in the horizontal direction is denoted by H and the relative position of the projection area in the vertical direction is denoted by V. When the disposition information of each projector is denoted by (H, V), the disposition information of the first projector 21 is (1, 1), the disposition information of the second projector 22 is (2, 1), the disposition information of the third projector 23 is (1, 2), and the disposition information of the fourth projector 24 is (2, 2).

The disposition information is input by a user using an input device or a monitor device of the second computer, for example, when the plurality of projectors 2 is installed. For example, the correspondence information determining unit 62 displays a list of the external connection connectors of the image output unit on the monitor of the second computer, and the user inputs disposition information of the projectors that are connected to the external connection connectors. The correspondence information determining unit 62 associates the ID of an external connection connector with data representing the relative position of the projection area, for which the projector connected to the external connection connector is responsible, in the array of the plurality of the projection areas so as to be formed as the disposition information, and stores the disposition information in the storage unit 63 or the like.

The correspondence information determining unit 62 acquires the correspondence relationship between each identification diagram within the photographed pattern and the projector projecting the identification diagram by using the disposition information and the array information of the identification diagrams that is output from the first pattern detecting unit 64. More specifically, the correspondence information determining unit 62 acquires the aligning position of each identification diagram in two directions of the photographed pattern that corresponds to the horizontal and vertical directions of the projection surface by referring to the array information of the identification diagrams. Here, the relative position for a case where with the above-described first projection area A1 is used as a reference will be described. The relative position of each identification diagram in the horizontal direction of the photographed pattern is denoted by "h", the relative position thereof in the vertical direction is denoted by "v", and such a set is denoted by "(h, v)".

For example, the correspondence information determining unit 62 determines that the identification diagram disposed at the position (h, v)=(1, 1) is projected from the projector (here, the first projector 21) disposed at the position (H, V)=(1, 1) according to the disposition information. Similarly, a search is performed for a projector that is defined in the disposition information to be responsible for the projection area of which the relative position in the array of the projection areas is the same as the relative position of each identification diagram in the array of the identification diagrams. The correspondence information determining unit 62, for each identification diagram as a target, acquires data associating the ID of the external connection connector corresponding to the projector that has projected the target identification diagram with the target identification diagram as the correspondence information. Then, the correspondence information determining unit 62 outputs the correspondence information to the second pattern detecting unit 65.

The second pattern detecting unit 65 detects a plurality of characteristic points included in the characteristic point pattern located inside the photographed image. The second pattern detecting unit 65 reads out the image data representing the photographed pattern detected by the first pattern detecting unit 64 from the storage unit 63. Then, the second pattern detecting unit 65 estimates the range of the projection area in which each identification diagram is projected on the photographed pattern by referring to the array information of the identification diagrams that is output from the first pattern detecting unit 64. The second pattern detecting unit 65 detects a characteristic diagram by searching the inside of the estimated range of each projection area and acquires the position of the characteristic point, which is defined in the detected characteristic diagram, on the photographed pattern. The second pattern detecting unit 65 outputs the acquired position of each characteristic point to the correction information calculating unit 61 as data for each projection area to which the target characteristic point belongs.

In addition, for example, the second pattern detecting unit 65 may be configured to estimate a rough position of each characteristic diagram on the photographed pattern by using the relative position of each characteristic diagram with respect to the identification diagram that is defined in the measurement image data. When each characteristic diagram is detected by analyzing the periphery of the estimated rough position, projection can be precisely performed without increasing the calculation load, whereby the characteristic diagram can be detected with high precision. Furthermore, in a case where detection of several characteristic diagrams fails, for example, the second pattern detecting unit 65 may be configured to calculate the position of the characteristic point defined in the characteristic diagram by using a value estimated as the rough position of the characteristic diagram In such a case, divergence of the process due to the failure of detection of the characteristic diagram can be avoided.

The correction information calculating unit 61 calculates the correction information by comparing the detected position of the characteristic point that is detected by the second pattern detecting unit 65 and the position of the characteristic point on the measurement image data. The position of the characteristic point that is detected by the second pattern detecting unit 65 is output as the data for each projection area, and the correspondence relationship between the projection areas and the projectors is known. Accordingly, the correction information for each projector can be acquired. The correction information calculating unit 61 outputs the calculated correction information to the image control device 5. The image control device 5 stores the correction information that is output from the correction information calculating device 6 in the memory section of the image correction unit 53 so as to update the correction information.

Figure 5:
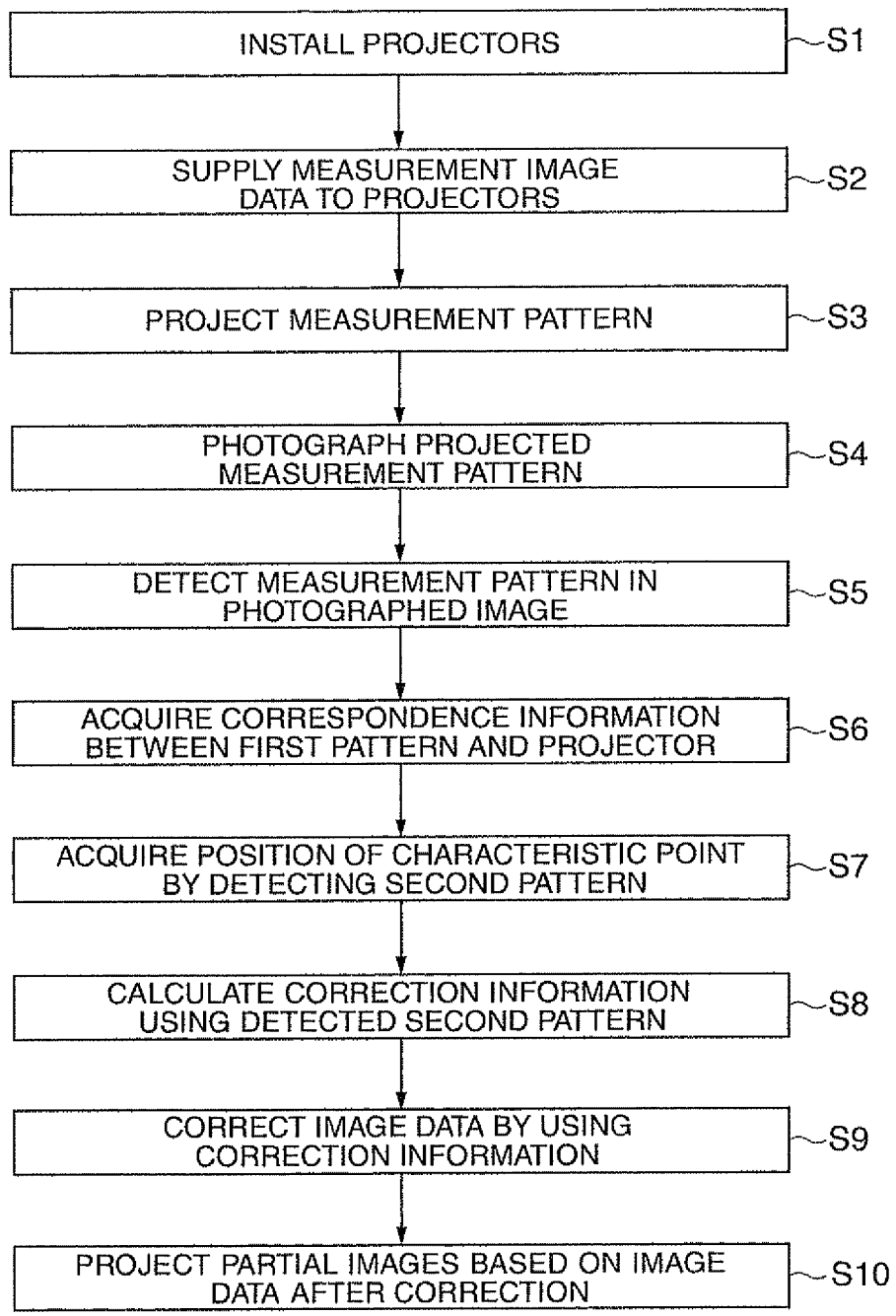
FIG. 5 is a flowchart representing the process flow until a content image is displayed.

FIG. 5 is a flowchart representing the process flow until a content image P is displayed. Here, an example in which the correction information is calculated at the time of installing the image display system 1 will be described. By performing the processes of Steps S5 to as below, one type of an image processing method according to an embodiment of the invention can be performed. By using a program that allows a computer to perform the processes of Steps S5 to S7, the function of a correction information calculating device according to an embodiment of the invention can be realized. By using a program that allows a computer to perform the processes of Steps S5 to S8, the function of an image processing apparatus according to an embodiment of the invention can be realized.

As shown in FIG. 5, first, a plurality of projectors 2 is disposed on the projection surface 9, and the arrangement of the projectors is roughly adjusted as is necessary (Step S1). In Step S1, for example, a disposition guide representing the contour of the projection area (hereafter, referred to as a partial projection area) is projected onto a projection surface 9 from each of the first to fourth projectors 21 to 24. Then, each projector is moved while referring to the disposition guide, whereby the position of each projection area occupying the total projection area A0 is roughly adjusted. After the projectors are disposed, the above-described disposition information of the projectors is input.

In this embodiment, the projectors are disposed such that the relative position of each projector in the array of the plurality of the projectors 2 coincides with the relative position of the projection area for which the projector is responsible in the array of the plurality of the projection areas. By allowing the array of the projectors to be similar to the array of the projection areas, the correspondence relationship between the projectors and the projection areas can be easily acquired, and a difference in the degree of distortion of the partial images due to a difference in the projection directions can be decreased.

In addition, the input of the disposition information may be performed at any timing before Step S6, For example, the disposition information may be input before the installation of the projectors. In addition, a guide that represents the contour of the overlapping area defined as the set value of the overlapping amount may be projected as a part of the above-described disposition guide. In a case where the correction information is calculated, for example, at the time of maintenance of the image display system 1 after installation of the image display system 1, the above-described Step S1 may be omitted.

Next, the correction information calculating unit 61 of the correction information calculating device supplies the measurement image data representing the measurement pattern of each projector to a target projector (Step S2). The first to fourth projectors 21 to 24 are operated so as to project the measurement patterns onto the projection surface 9 based on the supplied measurement image data (Step S3). Here, the measurement patterns are projected in parallel by the first to fourth projectors 21 to 24.

Next, the photographing device 4 photographs an area including the projected measurement patterns T11 to T14 on the projection surface 9 (Step S4).

Next, the first pattern detecting unit 64 of the correction information calculating device 6 detects a measurement pattern (a photographed pattern) inside the photographed image photographed by the photographing device 4 and detects an identification diagram (a first pattern) inside the photographed pattern (Step S5). The first pattern detecting unit 64 outputs information that represents the disposition of each detected identification diagram to the correspondence information determining unit 62.

Next, the correspondence information determining unit 62 of the correction information calculating device 6 receives the disposition information of the projectors that is input by the user and acquires the correspondence information by comparing the disposition information with the data output from the first pattern detecting unit 64 (Step S6).

Next, the second pattern detecting unit 65 of the correction information calculating device 6 estimates the range of each projection area on the photographed pattern by using the correspondence information output from the correspondence information determining unit 62. The second pattern detecting unit 65 detects each characteristic diagram (second pattern) included in the range of each estimated projection area and outputs the position of the characteristic point defined in each detected characteristic diagram as data for each projection area (Step S7).

Next, the correction information calculating unit 61 of the correction information calculating device 6 calculates the correction information by comparing the position of the characteristic point, which is output from the second pattern detecting unit 65, on the photographed pattern and the position of the characteristic point defined in the measurement image data (Step S8). The method of calculating the correction information is not particularly limited, as long as it is a method capable of acquiring information representing the correspondence relationship between the position of the pixel of the image forming element of each projector and the position of the pixel on the projection surface 9. For example, as the method of calculating the correction information, there are the following two methods.

In a first method, the correction information calculating unit 61 acquires a projection conversion in which the measurement pattern defined in the measurement image data is converted into a photographed pattern. Through this projection conversion, the coordinates (i,j) of each pixel on the image data is converted, and the correction information as a data table for each pixel is calculated. In addition, even in a case where a projection conversion for converting the photographed pattern into a measurement pattern defined in the measurement image data is acquired, correction information representing the correspondence relationship between the coordinates of the pixel of the image forming element and the position of the pixel on the projection surface is acquired.

Figure 6:
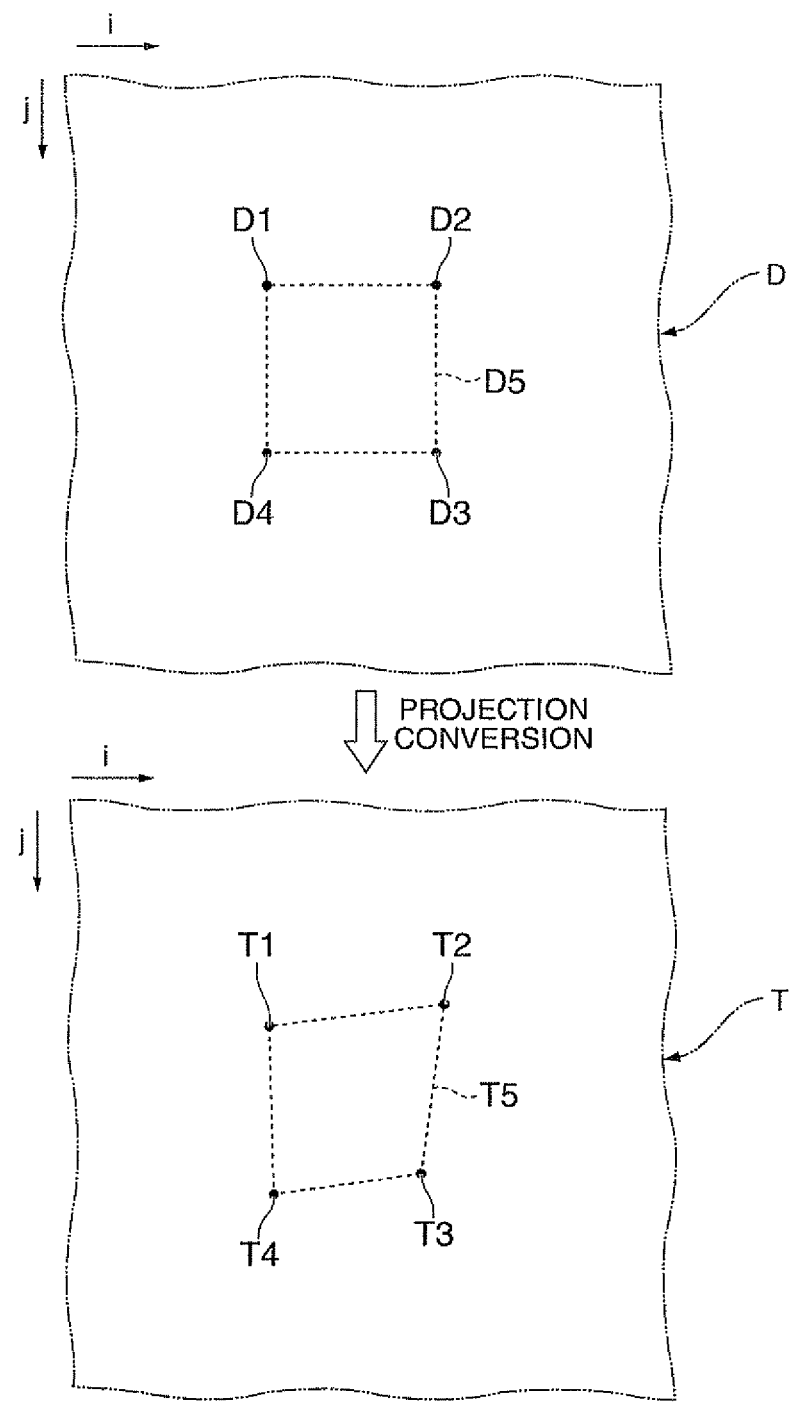
FIG. 6 is an explanatory diagram showing an example of a method of calculating correction information.

FIG. 6 is an explanatory diagram showing an example of a method of calculating the correction information. FIG. 6 conceptually illustrates a part of the measurement pattern D defined in the measurement image data and the photographing pattern T on the image data. In FIG. 6, reference numerals D1 to D4 represent characteristic points included in the measurement pattern D. The characteristic points D1 to D4 are selected such that a line sequentially joins the characteristic points forms the contour of the area D5. In FIG. 6, reference numerals T1 to T4 represent the characteristic points included in a photographed pattern T. The characteristic points T1 to T4 are characteristic points corresponding to the characteristic points D1 to D4 of the projected measurement pattern D. A line sequentially joining the characteristic points T1 to T4 forms the contour of the area T5.

The conversion equations for the projection conversion can be represented in Equations (1) and (2) shown below. In Equations (1) and (2), (x, y) represents the ij coordinates (i,j) of an arbitrary point before conversion, and (X, Y) represents the ij coordinates (i,j) of the converted position of this point. In addition, a to h represent conversion coefficients, and by acquiring a to h, one projection conversion is acquired.

$$X=(ax+by+c)/(gx+hy+1) \quad (1)$$

$$Y=(dx+ey+f)/(gx+hy+1) \quad (2)$$

Each of the coordinates of the characteristic points D1 to D4 are defined in the measurement image data and are known. Each of the coordinates of the characteristic points T1 to T4 are known by detecting the characteristic points from the photographed pattern T. When (x, y) shown in Equations (1) and (2) are substituted by the coordinates of the characteristic point D1, and (X, Y) is substituted by the coordinates of the characteristic points T1, two relational equations of a to h are acquired. Similarly, by substituting the coordinates of a set of characteristic points D2 and T2, a set of characteristic points D3 and T3, and a set of characteristic points D4 and T4 coordinates in the equations, eight relational equations are acquired for eight unknown letters a to h. By solving this linear equations with eight variables, a to h used for the projection conversion for converting the area D5 into the area T5 are acquired. By substituting (x, y) with the coordinates of each pixel included on the periphery and the inside of the area D5 in the acquired projection conversion, the coordinates of each pixel, which has one-to-one correspondence for each pixel of the area T5 on the area T5 are acquired.

Here, the characteristic points D1 to D4 are selected based on the characteristic points included in the measurement pattern, and a projection conversion for the area D5 forming a part of the measurement pattern D is acquired. Then, by selecting other characteristic points as the characteristic points D1 to D4, the projection conversion is acquired with a different area D5. By using the acquired projection conversion, as described above, the coordinates of each pixel of the area T5 that has one-to-one correspondence relationship for each pixel of the area D5 are acquired. As above, the coordinates of each pixel of the measurement pattern and the coordinates of the pixel of the photographed pattern corresponding to each pixel are acquired by acquiring the projection conversion for each part of the measurement pattern. The coordinates of each pixel of the measurement pattern has correspondence relationship with the position of the pixel of the image forming element of the projector. In addition, the coordinates of the pixel of the photographed pattern have correspondence relationship with the position of the pixel on the projection surface. Accordingly, as a result, correction information that represents the correspondence relationship between the coordinates of the pixel of the image forming element and the position of the pixel on the projection surface is acquired.

For example, by performing the above-described projection conversion for each of the coordinates of each pixel of the image forming element, the coordinates of the pixel (hereinafter, referred to as a converted pixel) on the projection surface 9 are acquired. By referring to a maximum value and a minimum value of the coordinates of the converted pixel, the range of the effective projection area A is set automatically or manually. Then, by arranging the array of the pixels (display pixels) corresponding to the format of the content image or the number of pixels, the coordinates of each display pixel on the projection surface 9 are acquired based on the set values of the effective projection area A. In a case where the coordinates of the display pixel are mismatched with the coordinates of the converted pixel, an interpolation coefficient representing the weight of the interpolation corresponding to a distance between the peripheral converted pixel and the display pixel may be acquired, so that the pixel data of a display pixel can be acquired through interpolation by using the image data supplied to converted pixels located on the periphery of the display pixel. This interpolation coefficient is fixed for each display pixel and may be stores as a part of the correction information.

In a second method, a projection conversion (an inverse conversion of the projection conversion according to the first method) for converting the photographed pattern into a measurement pattern defined in the measurement image data is acquired. In addition, for example, the range of the total projection area A0 is estimated by using the position of the characteristic point included in the photographed pattern, and the range of the effective projection area A is set automatically or manually. The, by arranging the array of the display pixels corresponding to the format of the content image or the number of pixels inside the effective projection area A, the coordinates of each display pixel on the projection surface 9 are acquired based on the set value of the range of the effective projection area A. By converting the acquired coordinate of each display pixel through projection conversion, the position of the pixel (hereinafter, referred to as a modulation unit), which corresponds to each display pixel on the projection surface 9, on the image forming element is acquired. In a case where the acquired position of the modulation unit is not matched with the actual position of the modulation unit, in other words, in a case where two or more display pixels corresponds to the modulation unit, an interpolation coefficient may be acquired, so that the pixel data input to each modulation unit can be acquired through interpolation as is necessary. As described above, the acquired interpolation coefficient may be stores as a part of the correction information.

Returning back to the description presented with reference to FIG. 5, in a case where the content image P is displayed, the image control device 5 generates partial image data for each projector based on the image data representing the content image P, and performs a position correction process for the image data by using the correction information (Step S9).

Next, the image processing apparatus 3 supplies the partial image data after the position correcting process to the target projector. Each of the first to fourth projectors 21 to 24 project a partial image based on the supplied partial image data (Step S10). As above, the content image P formed from the first to fourth partial images P1 to P4 is displayed.

In the correction information calculating device according to this embodiment, the correspondence information representing the correspondence relationship between each identification diagram and the projector that has projected the identification diagram is acquired by referring the disposition information according to user's input by using the correspondence information determining unit 62. Accordingly, the correspondence information can be acquired in a simple manner. In other words, since the correspondence information can be acquired when the array of the identification diagrams can be detected, and accordingly, the degree of necessity for configuring the identification diagram to have information used for identifying the projector that has projected the identification diagram is low, whereby an identification diagram having a simple shape can be used. In addition, the degree of necessity for configuring the shapes of the identification diagrams to be different for the plurality of the projection areas is low. Accordingly, the degree of necessity for performing a complicated process for detecting the identification diagram is low, and the correspondence information can be efficiently acquired. In addition, since the correction information calculating unit calculates the correction information based on the correspondence information, consequently, a correction information calculating device capable of efficiently calculating the correction information is acquired.

In this embodiment, based on the position of an identification diagram detected by the first pattern detecting unit 64, the range of the projection area, in which the identification diagram is projected, on the photographed pattern is estimated, and the position of the characteristic point is acquired within the estimated range for each projection area. Accordingly, even in case where characteristic diagrams having the same shape are projected in a plurality of the projection areas, the projection area to which each characteristic diagram belongs can be easily determined. Therefore, divergence of the process, for example, due to detection of characteristic diagrams belonging to different projection areas can be avoided.

The image processing apparatus 3 according to this embodiment can efficiently acquire the correction information by using the correction information calculating device 6. Accordingly, the distortion of partial images and a difference between the relative positions of the partial images can be corrected without effort for acquiring the correction information.

The image display system 1 according to this embodiment can efficiently calculate the correction information and correct the distortion of the partial images and a difference between the relative positions of the partial images with high precision based on the correction information, and thereby capable of improving the convenience and displaying a high-quality image.

According to an image processing method of this embodiment, the correspondence information can be acquired in a simple manner, and the correction information can be efficiently calculated. Therefore, the distortion of partial images and a difference between the relative positions of the partial images can be corrected without the efforts for acquiring the correction information.

The technical scope of the invention is not limited to the embodiment described here. Thus, the embodiment can be changed in various forms in the range not departing from the concept of the invention. For example, in the above-described embodiment, the measurement pattern including the identification pattern and the characteristic point pattern is used. However, the characteristic point pattern may be omitted by using the characteristic point included in the identification pattern for calculating the correction information. In such a case, at least a difference between the relative positions of a plurality of partial images can be corrected in a simple process. This technique is particularly effective in a case where local distortion of the partial images is small such as a case where the local distortion is small, for example, due to sagging of the projection surface or the like. In addition, the characteristic point pattern may be projected separately from the identification pattern.

The entire disclosure of Japanese Patent Application No. 2010-42464, filed Feb. 26, 2010 is expressly incorporated by reference herein.

What is claimed is:

1. A correction information calculating device that calculates correction information representing a correspondence relationship between positions of pixels in an image projected onto projection areas of a projection surface from projectors each including an image forming element and positions of pixels in the image forming element, the correction information calculating device comprising:
a correspondence information determining unit that:
acquires correspondence information representing the correspondence relationship between
identification patterns on the projection surface, and
the projectors projecting the identification patterns
by comparing relative positions of identification diagrams in an array of a plurality of the identification patterns inside a photographed image,
the photographed image acquired by photographing a plurality of the identification diagrams arranged on the projection surface when the identification patterns, including the identification diagrams, are projected from a plurality of the projectors
and a disposition information representing a correspondence relationship between relative positions of the projection areas in an array of a plurality of the projection areas according to the plurality of the projectors and the projectors projecting an image onto the projection areas; and
a correction information calculating unit including first and second pattern detecting units which is different from first pattern detecting unit, wherein
the first pattern detecting unit establishes a correspondence between a first projected pattern and a first projector based on a first diagram, and
the second pattern detecting unit determines the positions of a plurality of characteristic points in a second diagram different from the first diagram projected by the projector determined by the first pattern detecting unit,
the correction information calculating unit:
calculates the correction information
by associating and comparing, based on the correspondence information, the positions of the plurality of characteristic points defined in original data of characteristic point patterns, including the plurality of the characteristic points, the original data being supplied to the projectors, and the positions of the plurality of characteristic points inside the photographed image acquired by photographing the characteristic point patterns being projected based on the original data, wherein
the characteristic point patterns projected from the plurality of the projectors are photographed at the same time.

2. The correction information calculating device according to claim 1, further comprising:
a first pattern detecting unit that detects the identification patterns inside the photographed image acquired by photographing measurement patterns on the projection surface at a time when the plurality of the projectors projects the measurement patterns including characteristic point patterns and the identification patterns; and
a second pattern detecting unit that detects the plurality of the characteristic points included in the characteristic point patterns inside the photographed image, wherein
the correspondence information determining unit acquires the correspondence information based on a detection result of the first pattern detecting unit,
the second pattern detecting unit detects the characteristic point patterns by referring to the relative positions of the characteristic point patterns with respect to the identification patterns defined in the original data of the measurement patterns by using the correspondence information, and
the correction information calculating unit acquires the correction information based on a detection result of the second pattern detecting unit.

3. An image processing apparatus comprising:
the correction information calculating device according to claim 2; and
an image correcting unit that corrects image data such that an image projected onto the projection surface by projectors based on the image data after correction approximately coincides with an image represented by the image data before correction by referring to correction information calculated by the correction information calculating device.

4. An image display system comprising:
an image processing apparatus according to claim 3; and
a plurality of projectors that projects an image based on image data after correction that is corrected by the image processing apparatus.

5. The correction information calculating device according to claim 1, wherein the disposition information is information that represents the relative positions of the projectors in the array of the plurality of the projectors at a time when the relative positions of the projectors in the array of the plurality of the projectors coincide with the relative positions of the projection areas of the projectors in the array of the plurality of the projection areas.

6. An image processing apparatus comprising:
the correction information calculating device according to claim 5; and
an image correcting unit that corrects image data such that an image projected onto the projection surface by projectors based on the image data after correction approximately coincides with an image represented by the image data before correction by referring to correction information calculated by the correction information calculating device.

7. An image display system comprising:
an image processing apparatus according to claim 6; and
a plurality of projectors that projects an image based on image data after correction that is corrected by the image processing apparatus.

8. The correction information calculating device according to claim 1, wherein the shapes of the identification diagrams included in the identification patterns that are projected by the plurality of the projectors are the same for the plurality of the projectors.

9. An image processing apparatus comprising:
the correction information calculating device according to claim 8; and
an image correcting unit that corrects image data such that an image projected onto the projection surface by projectors based on the image data after correction approximately coincides with an image represented by the image data before correction by referring to correction information calculated by the correction information calculating device.

10. An image display system comprising:
an image processing apparatus according to claim 9; and
a plurality of projectors that projects an image based on image data after correction that is corrected by the image processing apparatus.

11. The correction information calculating device according to claim 1,
wherein the identification diagram includes a plurality of the characteristic points, and
wherein the correction information calculating unit calculates the correction information by using the identification patterns inside the photographed image that are acquired by photographing the identification patterns projected by the projectors.

12. An image processing apparatus comprising:
the correction information calculating device according to claim 11; and
an image correcting unit that corrects image data such that an image projected onto the projection surface by projectors based on the image data after correction approximately coincides with an image represented by the image data before correction by referring to correction information calculated by the correction information calculating device.

13. An image display system comprising:
an image processing apparatus according to claim 12; and
a plurality of projectors that projects an image based on image data after correction that is corrected by the image processing apparatus.

14. An image processing apparatus comprising:
the correction information calculating device according to claim 1; and
an image correcting unit that corrects image data such that an image projected onto the projection surface by projectors based on the image data after correction approximately coincides with an image represented by the image data before correction by referring to correction information calculated by the correction information calculating device.

15. An image display system comprising:
an image processing apparatus according to claim 14; and
a plurality of projectors that projects an image based on image data after correction that is corrected by the image processing apparatus.

16. The correction information calculating device according to claim 1, wherein
each identification diagram is projected in an area of the projected image that does not overlap in an overlapping area with another projected image, and
the plurality of characteristic points are arranged on an outer side of the identification diagram such that they are positioned in the overlapping area.

17. The correction information calculating device according to claim 1, wherein the identification diagrams are different than the plurality of characteristic points.

18. An image processing method comprising:
calculating correction information representing a correspondence relationship between positions of pixels in an image projected onto projection areas of a projection surface from projectors each including an image forming element and positions of pixels in the image forming element; and
correcting image data such that an image projected onto the projection surface by projectors based on the image data after correction approximately coincides with an image represented by the image data before correction by referring to correction information,
wherein the calculating of correction information includes:
acquiring correspondence information representing the correspondence relationship between identification patterns on the projection surface and the projectors projecting the identification patterns by comparing relative positions of identification diagrams in an array of a plurality of the identification patterns inside a photographed image, the photographed image acquired by photographing a plurality of the identification diagrams arranged on the projection surface when the identification patterns including the identification diagrams are projected from a plurality of the projectors and a disposition information representing a correspondence relationship between relative positions of the projection areas in an array of a plurality of the projection areas according to the plurality of the projectors and the projectors projecting an image onto the projection areas; and
calculating the correction information, by a correction information calculating unit including a first pattern detecting unit and a second pattern detecting unit, which is different from first pattern detecting unit by:
establishing a correspondence between a first projected pattern and a first projector based on a first diagram by the first pattern detecting unit, and
determining the positions of a plurality of characteristic points in a second diagram different from the first diagram projected by the projector determined by the first pattern detecting unit by the second pattern detecting unit, wherein
the correction information calculating unit calculates correction information by associating and comparing, based on the correspondence information, the positions of the plurality of characteristic points defined in original data of characteristic point patterns, including the plurality of the characteristic points, the original data being supplied to the projectors, and the positions of the plurality of characteristic points inside the photographed image acquired by photographing the characteristic point patterns being projected based on the original data, wherein the characteristic point patterns projected from the plurality of the projectors are photographed at the same time.

19. The image processing method according to claim 18, wherein each identification diagram is projected in an area of the projected image that does not overlap in an overlapping area with another projected image, and the plurality of characteristic points are arranged on an outer side of the identification diagram such that they are positioned in the overlapping area.

20. The image processing method according to claim 18, wherein the identification diagrams are different than the plurality of characteristic points.

\* \* \* \* \*